US006634796B2

(12) United States Patent
de Jong et al.

(10) Patent No.: US 6,634,796 B2
(45) Date of Patent: Oct. 21, 2003

(54) POLARITY REVERSAL FOR FIBER OPTIC CONNECTIONS

(75) Inventors: Michael de Jong, Fort Worth, TX (US); Markus A. Giebel, Hickory, NC (US); Thomas A. Church, Saginaw, TX (US); Kevin L. Morgan, Paradise, TX (US); James P. Luther, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 09/343,763

(22) Filed: Jun. 30, 1999

(65) Prior Publication Data

US 2001/0026661 A1 Oct. 4, 2001

(51) Int. Cl.⁷ .................................................. G02B 6/38
(52) U.S. Cl. ............................. 385/56; 385/75; 385/76; 385/139
(58) Field of Search .......................... 385/53, 55, 56, 385/58, 59, 60, 70, 72, 75, 77, 78, 88, 76, 139, 89, 92

(56) References Cited

U.S. PATENT DOCUMENTS

| | | | | |
|---|---|---|---|---|
| 4,645,295 A | * | 2/1987 | Pronovost ................... | 350/96.2 |
| 5,166,995 A | * | 11/1992 | Briggs et al. ................. | 385/58 |
| 5,335,301 A | * | 8/1994 | Newman et al. ............... | 385/75 |
| 5,475,781 A | * | 12/1995 | Chang et al. .................. | 385/76 |
| 5,521,997 A | * | 5/1996 | Rovenolt et al. .............. | 385/77 |
| 5,712,938 A | * | 1/1998 | Lin et al. ....................... | 385/59 |
| 5,727,102 A | | 3/1998 | Jeong et al. ................... | 385/59 |
| 5,729,644 A | | 3/1998 | Shiflett et al. ................. | 385/59 |
| 6,173,099 B1 | * | 1/2001 | Kiernicki et al. .............. | 385/78 |

FOREIGN PATENT DOCUMENTS

| | | | | |
|---|---|---|---|---|
| DE | 9102805 U1 | 5/1991 | ............ | G02B/3/36 |
| GB | 2069175 A | 8/1981 | ............ | G02B/7/26 |

OTHER PUBLICATIONS

SIECOR, Field Installation of the Siecor FDDI I Connector, Siecor Recommended Procedure SRP–006–043, Issue 3, Mar. 1998, pp. 1–11.
SIECOR, FDDI Optical Cabling for FDDI, TR2–FDDI, pp. 11–12, date unknown.

* cited by examiner

Primary Examiner—Frank G. Font
Assistant Examiner—Michael P Mooney (57) ABSTRACT

Devices and methods are described that permit simple correction of a fiber optic polarity reversal problem. An adapter is described having receptacles to receive a connector on a first end, or user end, and on a second end, or contractor end. Both the receptacles provide keying arrangements so that the connectors can be received only when correctly oriented with respect to the adapter. The keying arrangement on the contractor end, however, is reversable so that the connector may be inserted in one of two predetermined orientations, at the behest of the contractor or installer. Adapters are also described that receive connectors only in a physically reversed orientation to counteract a reverse polarity condition. In addition, a jumper is described that can be interposed between a connector and adapter to correct a reverse polarity condition.

20 Claims, 13 Drawing Sheets

POLARITY REVERSAL FOR FIBER OPTIC CONNECTIONS

BACKGROUND

The present invention is directed to devices and methods for reversing the polarity of fiber optic cable connections. In particular aspects, the invention is directed to adapters for receiving and interconnecting cables having optical fibers therein.

In the fiber optic communication field, cables are used that contain a pair of, or sometimes more, individual optical fibers. Connectors, two of which that are being used today include the SC-DC and the MT-RJ connectors, are placed on the ends of the cables to retain the fibers in a particular orientation and position with respect to one another. The connectors include ferrules to hold and align the optical fibers. The fibers are generally secured within the ferrule using epoxy and then polished to ensure clear signal transmission.

When two optical cables must be joined at an interface, such as a wall or a connector panel, adapters are used to provide receptacles within which the connectors reside. Conventional adapters are similar in many respects to the well-known wall-mounted telephone jack that receives the connector on the end of a telephone cord and allows the wires inside the telephone cord to be interconnected with other circuits associated with the adapter. Like the connector for a telephone jack, fiber optic connector housings usually incorporate a keying arrangement that ensures that the connector can be inserted into the adapter only in a predetermined orientation with respect to the adapter.

Unlike telephone jacks, however, fiber optic adapters are formed to receive two connectors from opposite ends. These two ends are sometimes referred to as the user end and contractor end. The adapter locates the two connectors in an end-to-end relation such that the fibers within the two connectors are aligned and light can be transmitted from the optical fibers within one of the connectors to the optical fibers in the other connector.

Currently, fiber optic cables most often contain two optical fibers—a transmitting fiber and a receiving fiber. When the two connectors are inserted into the adapter, the transmitting fiber of one connector is aligned with the receiving fiber of the other connector, and vice versa. Occasionally, these two fibers become inadvertently reversed when the connector is installed onto the end of the cable. If this occurs, the polarity of the connection will be reversed, and the fiber optic system will not work properly when the connectors are installed in the adapter. Until now, the only method for resolving such a problem has been for an installer to cut the connector off the end of the cable and install a new connector so that the fibers are properly arranged. Because of the requirement to use epoxy to secure the fibers, and polish the fiber ends, the procedure is difficult to accomplish in the field. Even when performed under the best circumstances, however, there are risks of errors in the installation of the connector or damage to the fiber optic elements. In addition, installers need to carry additional connectors along with them and, if those are forgotten, lost, or used up, correction of the problem can be extremely difficult.

SUMMARY OF THE INVENTION

The present invention provides devices and methods that permit simple correction of a fiber optic polarity reversal problem. In particular embodiments, adapters are described having receptacles to receive a connector on a first end, or user end, and on a second end, or contractor end. Both the receptacles provide keying arrangements so that the connectors can be received only when correctly oriented with respect to the adapter. The keying arrangement on the contractor end, however, is reversible so that the connector may be inserted in one of two predetermined orientations, at the behest of the contractor or installer.

In some preferred embodiments described herein, an adapter provides a non-standard receptacle on the contractor end having a main entrance that permits entry and residence of the housing for a connector, and a pair of key ways. One of the key ways is located on the upper side of the main entrance, while the other key way is located on the lower side. A key excluder is selectively disposable within either one of the key ways to prevent the key portion of a connector from being disposed within that key way.

The adapter is preferably provided to a contractor and used in a "default" configuration in which the key excluder is placed in a predetermined one of the two key ways. This default configuration allows a connector to be received by the adapter on the contractor side in an orientation intended to correspond to a connector inserted into the user end so that polarity between the connectors is correct. In the event of a reverse polarity mistake, the installer removes the key excluder and inserts it in the other key way. This allows the connector on the contractor side to be inverted when reinserted to the adapter receptacle. A number of different configurations for key excluders are described.

In alternative embodiment, adapters are described that only permit connectors to be inserted in a reverse configuration. This adapter can be substituted for a standard adapter when a polarity reversal problem is detected.

Embodiments are described for correction of a polarity reversal problem to be corrected where either MT-RJ or SC-DC connectors are used.

In a further embodiment, an exemplary jumper is described that can be interposed between a connector and adapter to reverse the polarity of the fibers associated with the connector.

It is to be understood that both the foregoing general description and the following detailed description are exemplary and explanatory only and are not restrictive of the invention as claimed.

The following drawings, which are incorporated in and constitute a part of this specification, illustrate several embodiments of the invention and, together with the description, serve to explain the principles of the invention.

DETAILED DESCRIPTION OF THE INVENTION

Figure 1A:
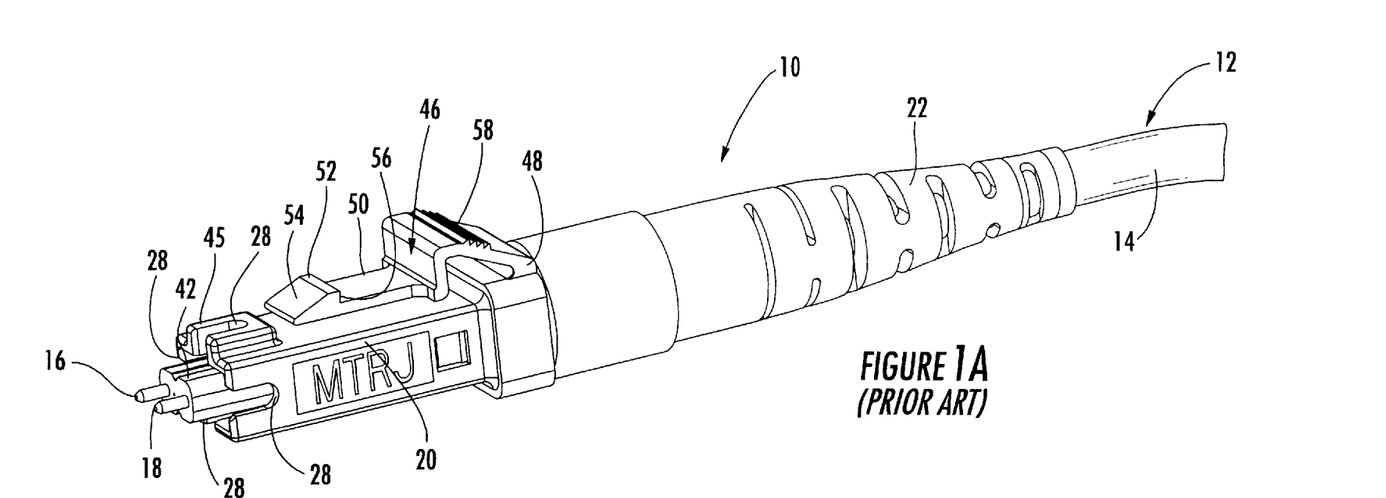
FIG. 1A is an isometric view of an exemplary prior art MT-RJ fiber optic cable end connector.
Figure 1B:
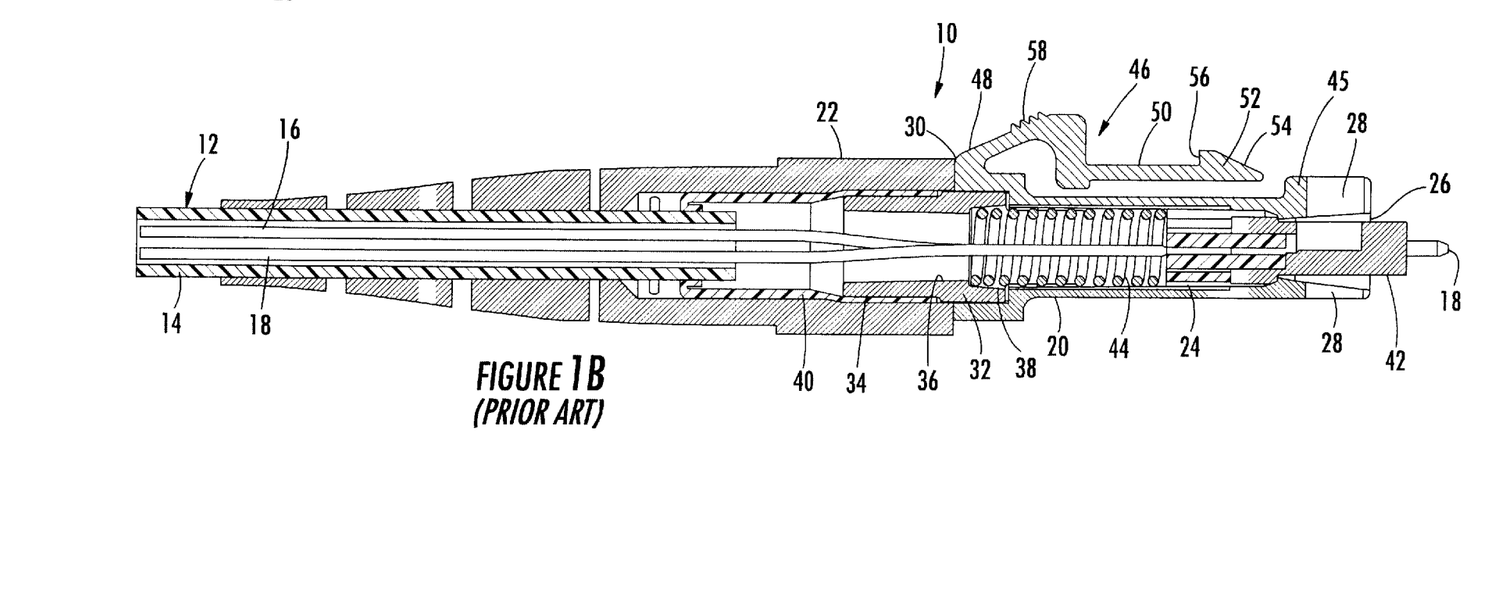
FIG. 1B is a cross-sectional side view of the connector shown in FIG. 1.

Referring first to FIGS. 1A and 1B, there is shown an exemplary prior art fiber optic cable end connector 10 shown affixed to one end of a fiber optic cable 12. The cable 12 includes an outer rubberized cover 14 that contains transmitting and receiving optic fibers 16, 18. The transmitting optic fiber 16 is used to transmit a signal along its length from a source (not shown) toward the end connector 10. The receiving optic fiber 18 receives a signal from the direction of the end connector 10 and transmits a signal along its length back to the source.

The end connector 10 includes a plastic housing 20 and a rubber cable sheath 22. As can be seen in FIG. 1B, the transmitting and receiving fibers 16, 18 extend beyond the end of the cable cover 14 and extend independently into the housing 20.

The plastic housing 20 is roughly block-shaped and defines a chamber 24 therewithin that receives the individual fibers 16, 18. The forward end 26 of the plastic housing 20 presents castellations 28 that are adapted to receive complimentary-shaped members in an adapter. The rear end 30 of the housing 20 has a crimp body 32 that presents an exterior radial surface 34 and an interior bore 36. The bore 36 has a radially enlarged portion 38 at the forward end to hold and center the spring member 44. A crimp band 40, which is usually constructed from metal, is secured by crimping to the exterior radial surface 34 of the crimp body 32 and secures that strength members (not shown) of the fiber optic cable 12.

The chamber 24 of the housing 20 encloses a ferrule 42 that is biased toward and beyond the forward end 26 of the housing 20 by a spring member 44 that is housed within the chamber 24 and centered by the enlarged portion 38 of the crimp body 32. The transmitting and receiving fibers 16, 18 extend through the crimp band 40, crimp body 32, the center of the spring member 44 and are secured inside the ferrule 42 through apertures or fiber bores that cause the fibers 16, 18 to be located a precise distance from one another.

The exterior of the housing 20 provides an outwardly extending orientation key 45 that is essentially a raised portion of the housing 20. An integrally-molded latch 46 is also provided that includes a hinge portion 48 and a forwardly-extending locking portion 50. The locking portion 50 features a locking tab 52 having a forwardly and upwardly facing angled cam face 54 and a rearwardly facing stop face 56. The latch 46 also includes a textured thumb engagement portion 58 against which a user can exert pressure to move the locking portion 50 of the latch 46 downwardly against the housing 20.

FIGS. 2–5 illustrate an exemplary adapter 60 constructed in accordance with the present invention. The adapter 60 is preferably formed of plastic and features a body 62 having two ends that will be referred to here as a user end 64 and a contractor end 66. A central portion of the body 62 has outwardly extending flanges 68, 70 on the upper side 72 and lower side 74, respectively, of the body 62. The flanges 68, 70 have openings 76 for the disposal of bolts, screws or other connectors so that the adapter 60 might be easily affixed to a slot in a connector box (not shown) or a, wall outlet box. Although slots are shown for the openings 76 in FIGS. 2–4, it will be understood that the openings 76 might also comprise holes such as those depicted in FIGS. 8 and 9. Alternatively, a clip (not shown) may be attached to the adapter 60 in the recessed portion 65. The clip has outwardly extending tabs or flanges to provide a friction fit in a panel or outlet box.

Figure 2:
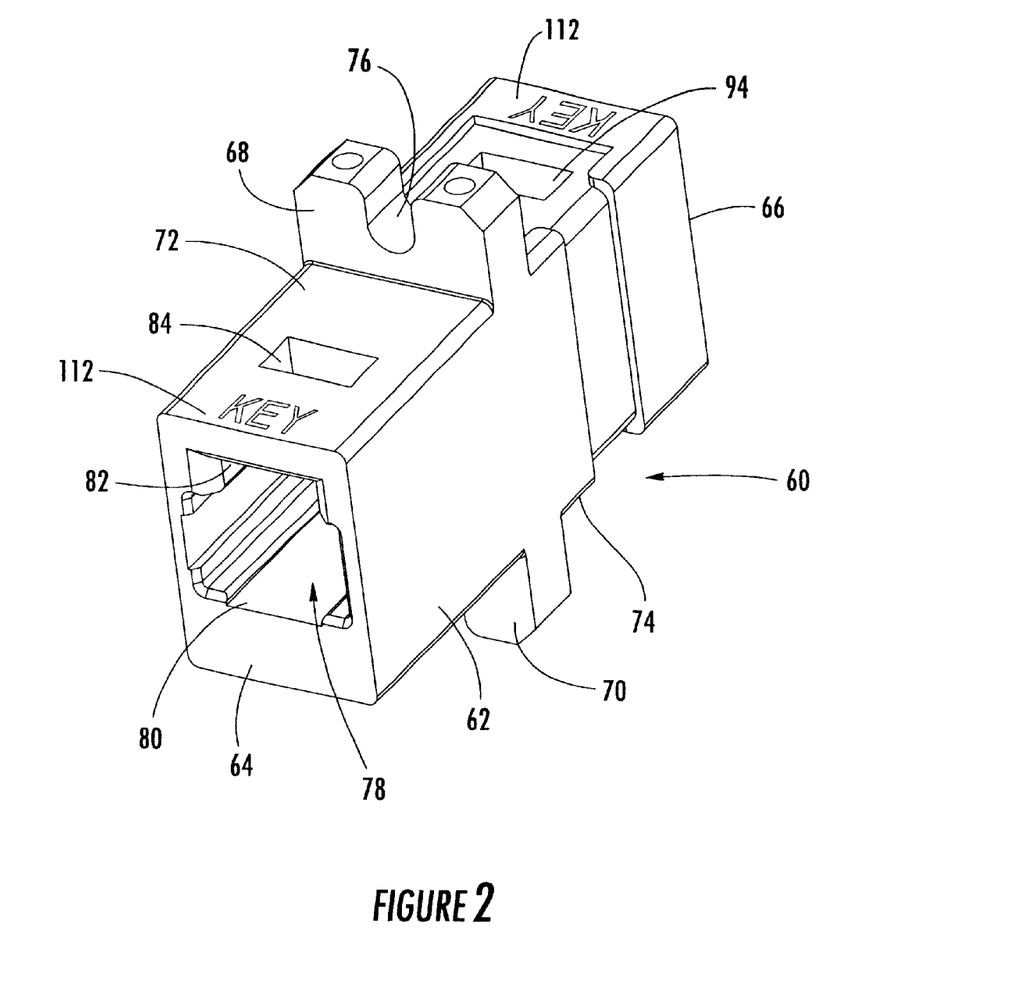
FIG. 2 is an isometric view of an exemplary MT-RJ adapter, constructed in accordance with the present invention, showing the user side of the adapter.

The user end 64 of the adapter 60 has a standard receptacle 78 formed therein. The opening of the standard receptacle 78 features a substantially rectangularly-shaped main entrance portion 80 that is shaped and sized to admit the housing 20 of a connector. On one side of the main entrance portion 80 is a lateral key slot 82 within which the key 45 of an MT-RJ connector 10 can be disposed. Because the key way 82 is only present on one side of the main entrance portion, an MT-RJ connector will only fit within the standard receptacle 78 when it is properly oriented with the adapter 60 in a standard orientation such that the key 45 can be disposed within the key slot 82. This keying arrangement prevents the connector from being inserted into the user end 64 while in an improper orientation.

Adjoining the key way 82 is a tab aperture 84 that is disposed through the body 62. The tab aperture 84 is shaped and sized to admit the entrance of the locking tab 52 of an MT-RJ connector. When an MT-RJ connector is slidingly disposed into the standard receptacle 78, the angled cam face 54 of the tab 84 permits the locking portion to be cammed downwardly toward the housing 20 so that the locking portion 50 can be slidingly inserted into the key way 82. When the tab 52 becomes aligned with the tab aperture 84, it snaps into the aperture 84.

It is pointed out that when an MT-RJ connector is seated within the standard receptacle 78 so that its locking tab 52 is disposed within the aperture 84, the connector cannot be inadvertently withdrawn since the stop face 56 of the tab 52 will matingly engage the side of the aperture 84. To remove the connector from the receptacle 78, a user must depress the engagement portion 58 of the latch 46 so that the locking portion 50 is moved downwardly toward the housing 20, thereby removing the tab 52 from the aperture 84 and permitting withdrawal.

Figure 3:
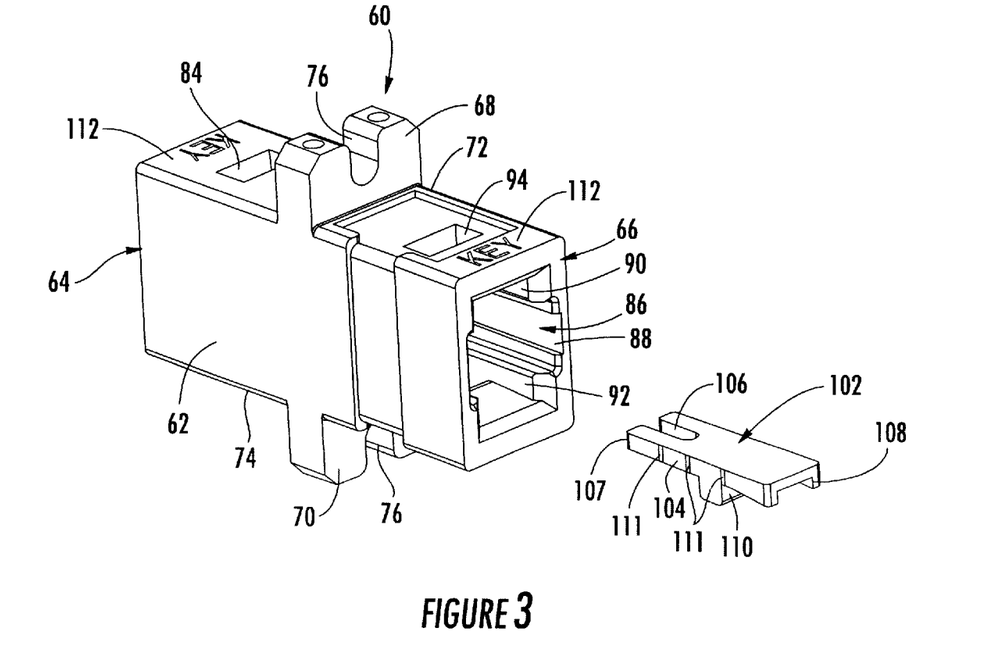
FIGS. 3 and 4 are isometric views of the exemplary adapter shown in FIG. 2, depicting the contractor side of the adapter.
Figure 4:
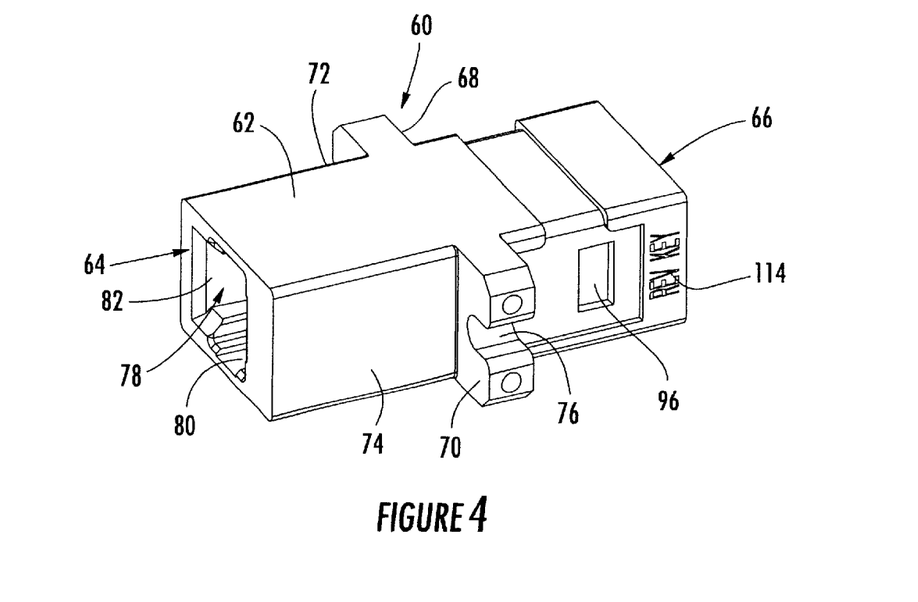
Figure 5:
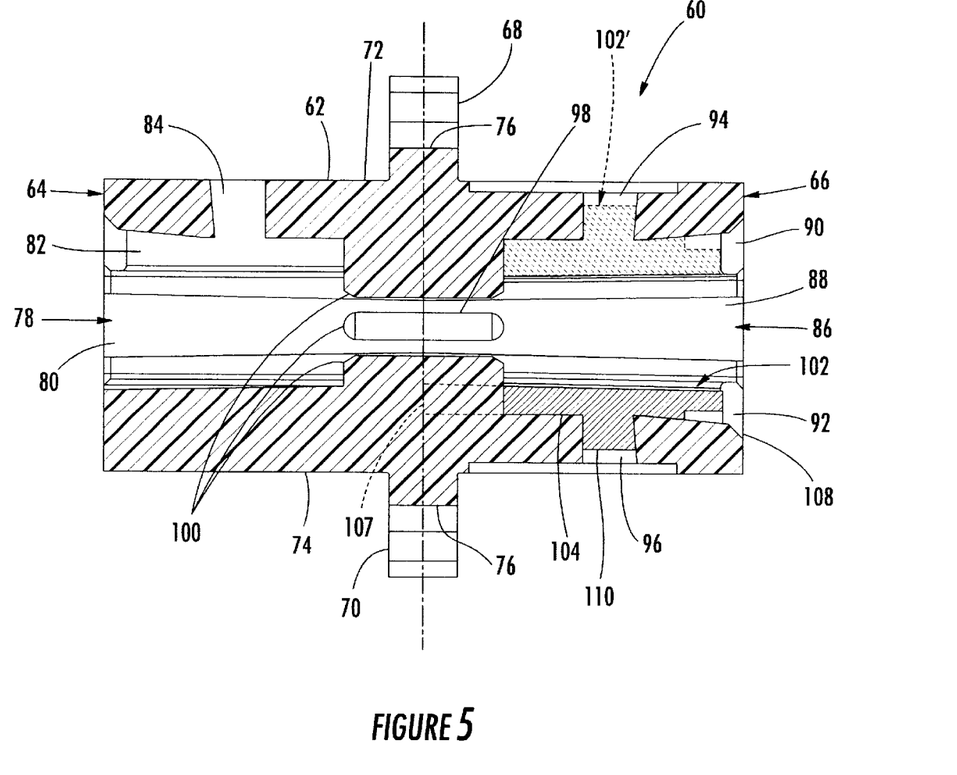
FIG. 5 is a cross-sectional view of the adapter shown in FIGS. 2 and 3 with the key excluder disposed within the adapter.

The contractor end 66 includes a novel, non-standard receptacle 86, which is best shown in FIGS. 3 and 5. The non-standard receptacle 86 features a central main entrance portion 88 with a pair of oppositely disposed first and second key ways 90, 92 located above and below the adjoining main entrance portion 88. First and second tab apertures 94, 96 are associated with the first and second key ways 90, 92, respectively, in the same manner as the tab aperture 84 was associated with the key way 82 on the user end 64. Tab apertures 94, 96 are located in opposite side walls of adapter body 62.

As FIG. 5 shows, a central passage 98 at the center of the body 62 of the adapter 60 allows communication between the main entrance portions 78 and 86. Four inward projections 100 (three shown in FIG. 5) are shaped and sized to reside within the castellations 28 on the forward end of an MT-RJ connector.

A key excluder 102 is shown in FIGS. 3 and 5. The key excluder 102 is shaped and sized to fit within one of the key ways 90, 92 in the adapter 60 such that an MT-RJ connector key cannot be disposed within that passage. The key excluder 102, as well as the adapter 60, may be fashioned of plastic, metal, or any other suitable material. The key excluder 102 includes a longitudinal main body 104 having a slot 106 at one longitudinal end 107 and a notch 108 at the other longitudinal end. A tab 110 extends laterally from a mid-portion of the body 104. The key excluder 102 also has extensions 111 (see FIG. 3), which in the embodiment shown are bumps, but could also be ridges, or other protrusions to frictionally engage the sides of a key way 90 or 92. Tab 110 is also sized to fit snugly in one of the tab apertures 94, 96. It can be seen from FIG. 5 that the longitudinal end 107 of the key excluder 102 thus lies flush with the first or user end 64 when inserted in either key way 90 or 92. Notch 108 allows the key excluder 102 to be pried out of one of the retainers 90, 92 with a screwdriver, pocket knife, etc.

In a default or normal configuration, the key excluder 102 is disposed within the lower key way 92 on the installer end 66 of the adapter body 62. This configuration is depicted in solid lines in FIG. 5. As can be seen there, the main body 104 of the excluder 102 lies within the key way 92 while the tab 110 of the excluder is disposed within the tab aperture 96. The slot 106 at the end of the body 104 receives one of the flanges 100.

Figure 6:
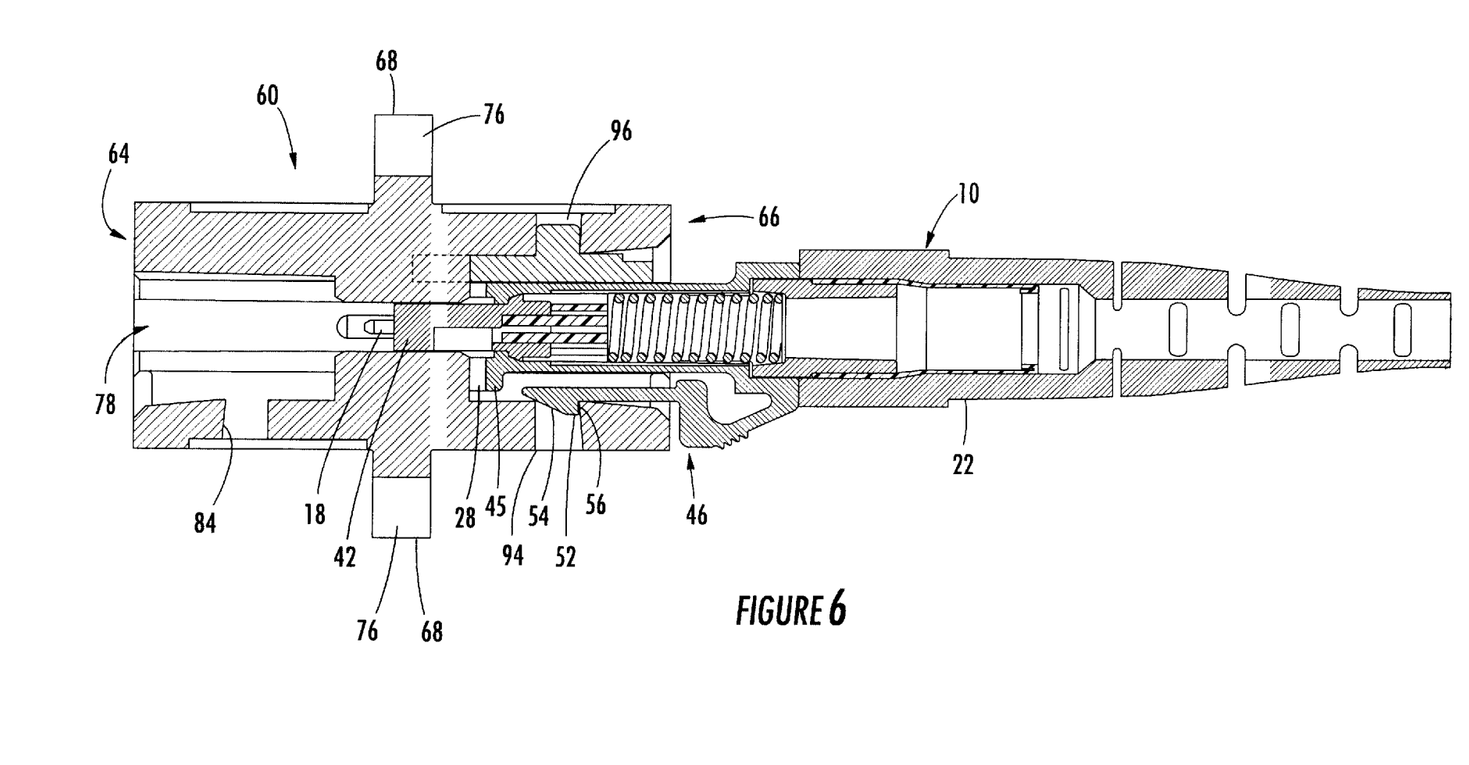
FIG. 6 is a cross-sectional side view illustrating a connector seated within an adapter.
Figure 7:
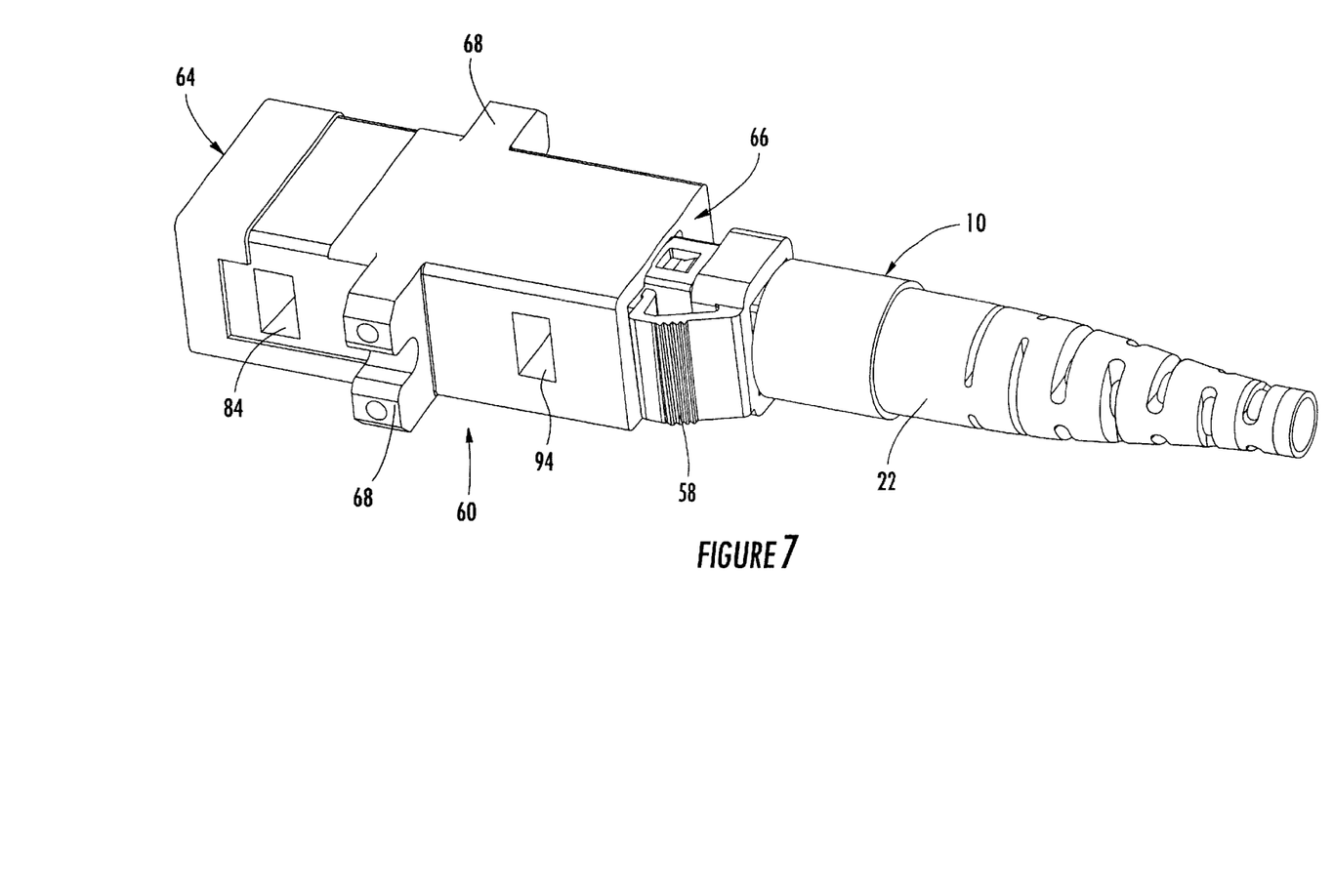
FIG. 7 is an isometric view of the arrangement shown in FIG. 6.

When the key excluder 102 is installed in this default configuration, an MT-RJ connector can only be inserted into the contractor end 66 of the adapter 60 in the standard orientation such that its key 45 is slidably inserted into the upper key way 90. FIGS. 6 and 7 show a connector seated in an adapter 60. The standard orientation of the connector to the adapter 60 is an intended and preferred orientation as it permits a connection between connectors on the contractor and user ends 66, 64 to be mated for correct polarity when the connectors are correctly installed on their cable ends. When two such connectors are inserted into the adapter 60 in this manner, the ferrules 42 of each connector will mate and permit transmission of data or information between the aligned optic fibers contained within each of the ferrules 42. As a result, it is preferred that the key excluder 102 be provided to an installer or contractor in the default configuration described here and that this configuration not be changed unless necessary.

If it is determined that the optic fibers 16, 18 of one of the two connectors has an incorrect polarity, such that data transmission between the connectors is impaired or impossible, the polarity of the fibers for the connector on the contractor end 66 can be quickly reversed. The key excluder 102 is removed from the lower key way 92 of the adapter body. A screwdriver blade (not shown) can be inserted into the screwdriver notch 108 and used to pry up the excluder 102 so that it can be withdrawn from the lower key way 92. The key excluder 102 is then inserted into the upper key way 90 so that it is in the position shown for excluder 102 in FIG. 5. In this "reverse" position, the excluder body 104 lies within the upper passage 90 and the tab 110 fits within the upper key aperture 94. The end slot 106 of the excluder 102 will receive the appropriate flange 100 on the upper side of the adapter body 62. When the key excluder 102 has been placed in this reverse configuration, an MT-RJ connector may be inserted into the contractor end 66 in an inverted, or reverse, orientation. The locking portion 50 of the MT-RJ connector resides within the lower key way 92 and the locking tab 52 resides within the tab aperture 96.

It is noted that printed indicia on the adapter 60 are used to assist in the proper placement of the key excluder 102. As an example, the word "KEY" is printed in locations 112 on the upper side 72 of the adapter body 62, indicating that the upper side 72 of the adapter body will accept the key 45 of an MT-RJ connector in the standard orientation. The words "REV KEY" 114 are printed on the lower side 74 of the adapter body 62 proximate the tab aperture 96 to indicate that the lower side 74 on the installer end 66 will accept a key 45 in a reversed orientation. However, any indicia may be used to indicate the standard and reversed orientations.

It can be seen that when the key excluder 102 is installed in its default configuration, entry of an MT-RJ connector into the contractor end 66 in an inverted orientation is prevented or locked out. Conversely, when the key excluder 102 is installed in its reverse configuration, entry of an MT-RJ connector into the installer end in the standard orientation is locked out.

It is further pointed out that the exemplary device described here only permits the orientation of the MT-RJ connector, and thus the polarity of the optic fiber cable 12 to be reversed, on one end of the adapter 60. It is currently preferred to permit a contractor, but not a user, to reverse the polarity of the fiber optic connection.

Figure 8:
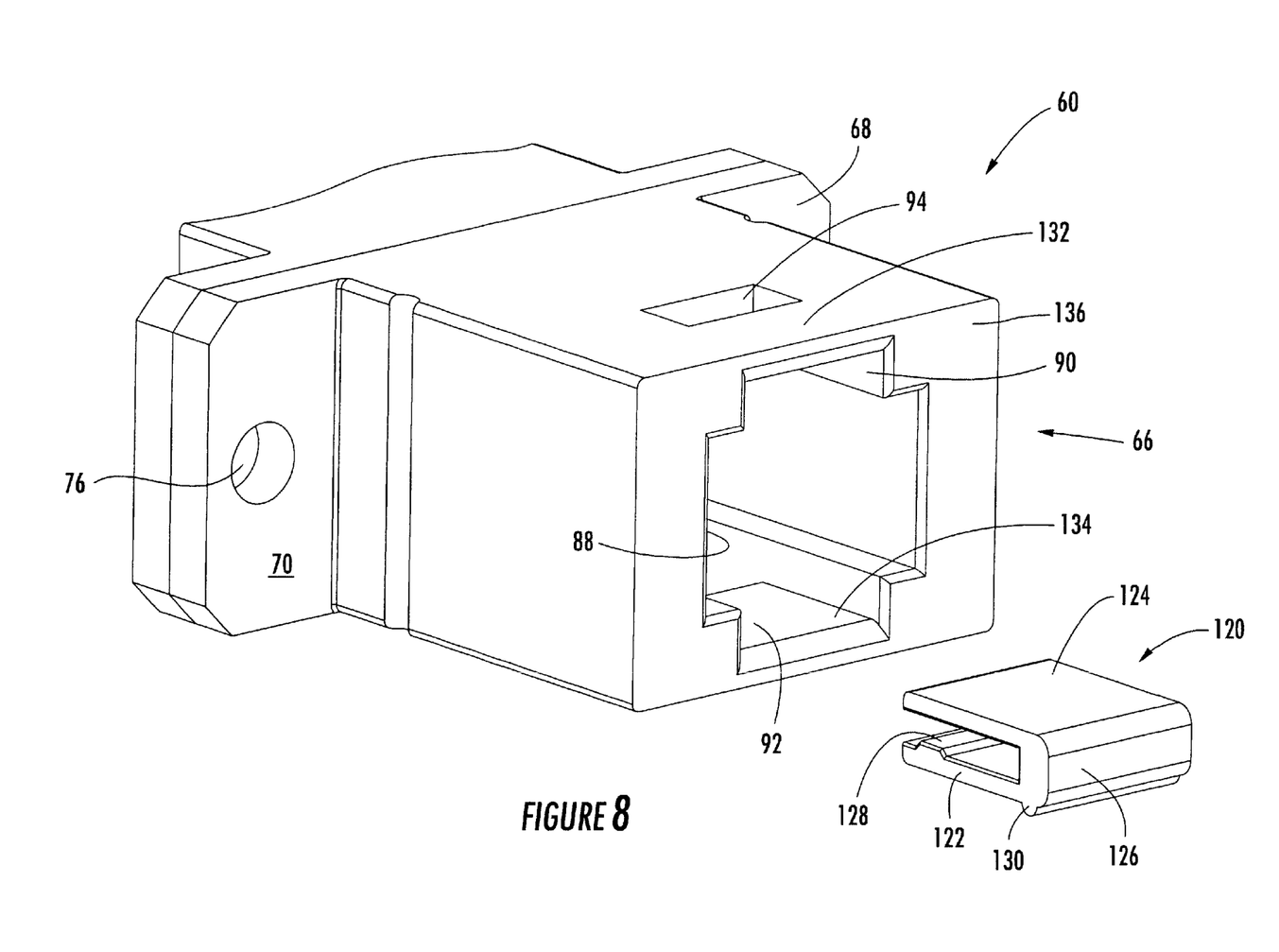
FIG. 8 is an isometric view depicting the contractor side of an MT-RJ adapter, in accordance with the present invention, having an alternative key excluder.

Referring now to FIG. 8, an alternative embodiment of the invention is described. For clarity among the different embodiments, like reference numerals are used for like components. The contractor end 66 of an MT-RJ adapter 60 is depicted, having a main entrance portion 80, a pair of lateral key ways 90, 92 and tab apertures 94 and 96 (not shown).

A removable clip 120 (shown removed from the adapter 60 in FIG. 8) is used as the key excluder. The exemplary clip 120 shown in FIG. 8 is generally U-shaped, having a pair of legs 122, 124 that are joined to one another by a central web 126. One of the legs 122 presents an inwardly projecting raised portion 128 and an outwardly directed projection 130. It is noted that the key ways 90, 92 are partially defined by housing portions 132 and 134 that extend from the end surface 136 of the contractor side 66 to the respective tab aperture 94, 96.

The clip 120 performs the same function as the key excluder 102 described earlier to selectively block one of the two key ways 90, 92. The clip 120 is inserted into either key way by sliding disposal over one of the housing portions 132 or 134 so that one of the legs 124 is disposed on one side of the housing portion and the other leg 126 is disposed on the other side of the housing portion. When in a seated position, the inwardly projecting raised portion 128 will reside within the respective tab aperture 94 or 96. When the clip 120 is so seated, the respective key way 90 or 92 is blocked to prevent entry of a key. Removal of the clip 120 is accomplished by gripping portions of the clip 120, such as the outwardly directed projection 130 and removing the clip 120 from its seated position.

Figure 9:
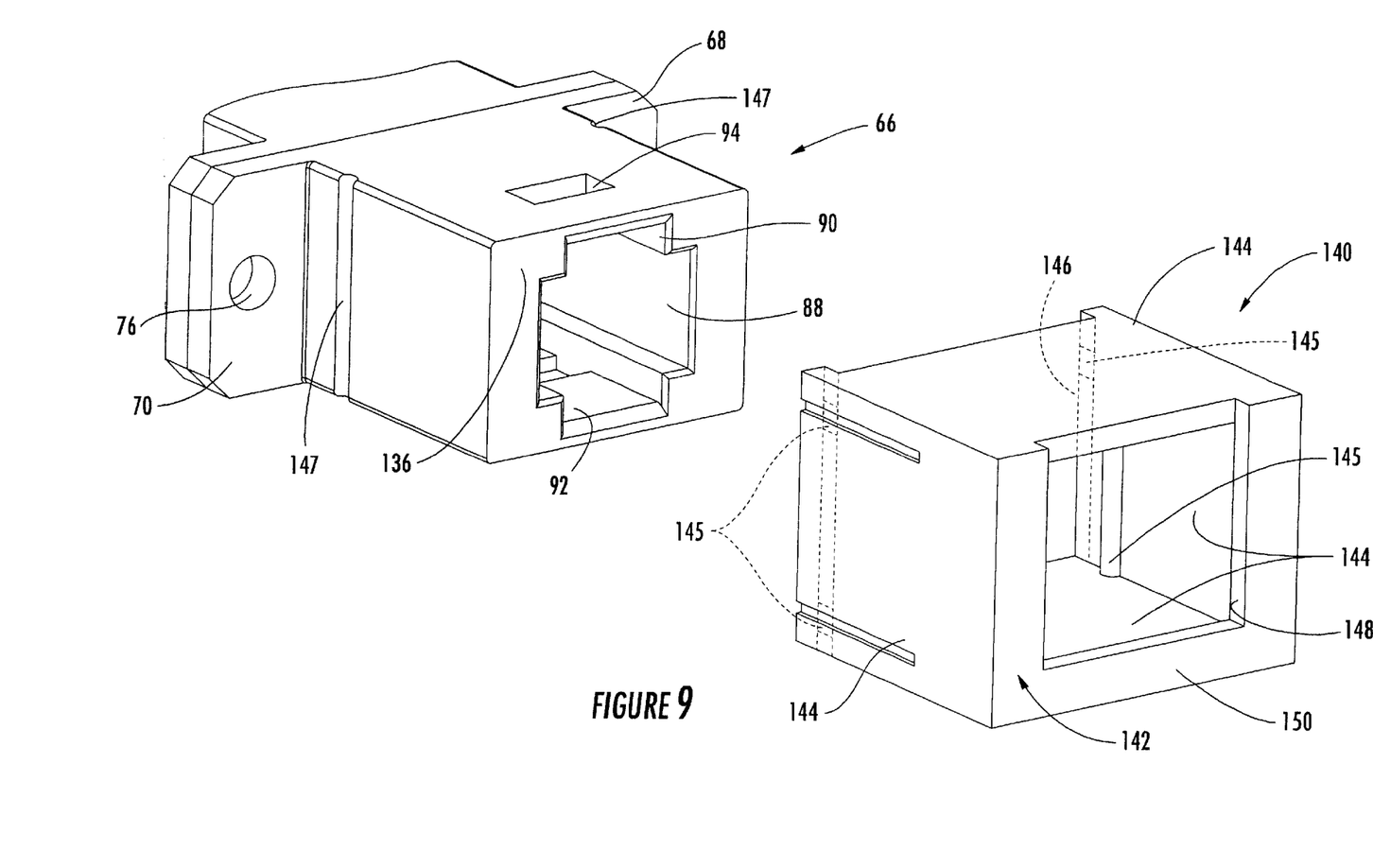
FIG. 9 depicts the contractor side of an MT-RJ adapter, in accordance with the present invention, having another alternative key excluder.

FIG. 9 illustrates a further alternative embodiment wherein the key excluder is provided by a reversable cover 140. The cover 140 has a face plate 142 and four adjoining side pieces 144 that define an opening 146. The laterally-located two of the side pieces 144 present inwardly-directed ribs 145 that are shaped and sized to engage slots 147 on the contractor side 66 to help retain the cover 140 in a seated position on the contractor side 66. The face plate 142 has an opening 148 that is slightly off-center so as to provide a panel 150 on one side of the face plate 142.

The opening 146 of the cover 140 is sized and shaped to receive the contractor side 66 of the adapter 60 therewithin so that when seated on the adapter 60, the side pieces 144 are located on each side of the adapter 60 and the face plate 142 abuts the end surface 136. When the cover 142 is oriented as shown in FIG. 9 and so seated, it will be understood that the panel 150 will block access to the lower key way 92. However, the main entrance portion 88 and the upper key way 90 will remain accessible through the opening 148. If the cover 140 is removed and seated on the adapter 60 in an inverted orientation, the panel 150 will block the upper key way 90 while the main entrance portion 88 and lower key way 92 can be accessed through the opening 148. Thus, the cover 140 can be used to selectively block entry of the key 45 of a connector into either the upper or lower key way 90, 92 of the adapter 60.

Figure 10:
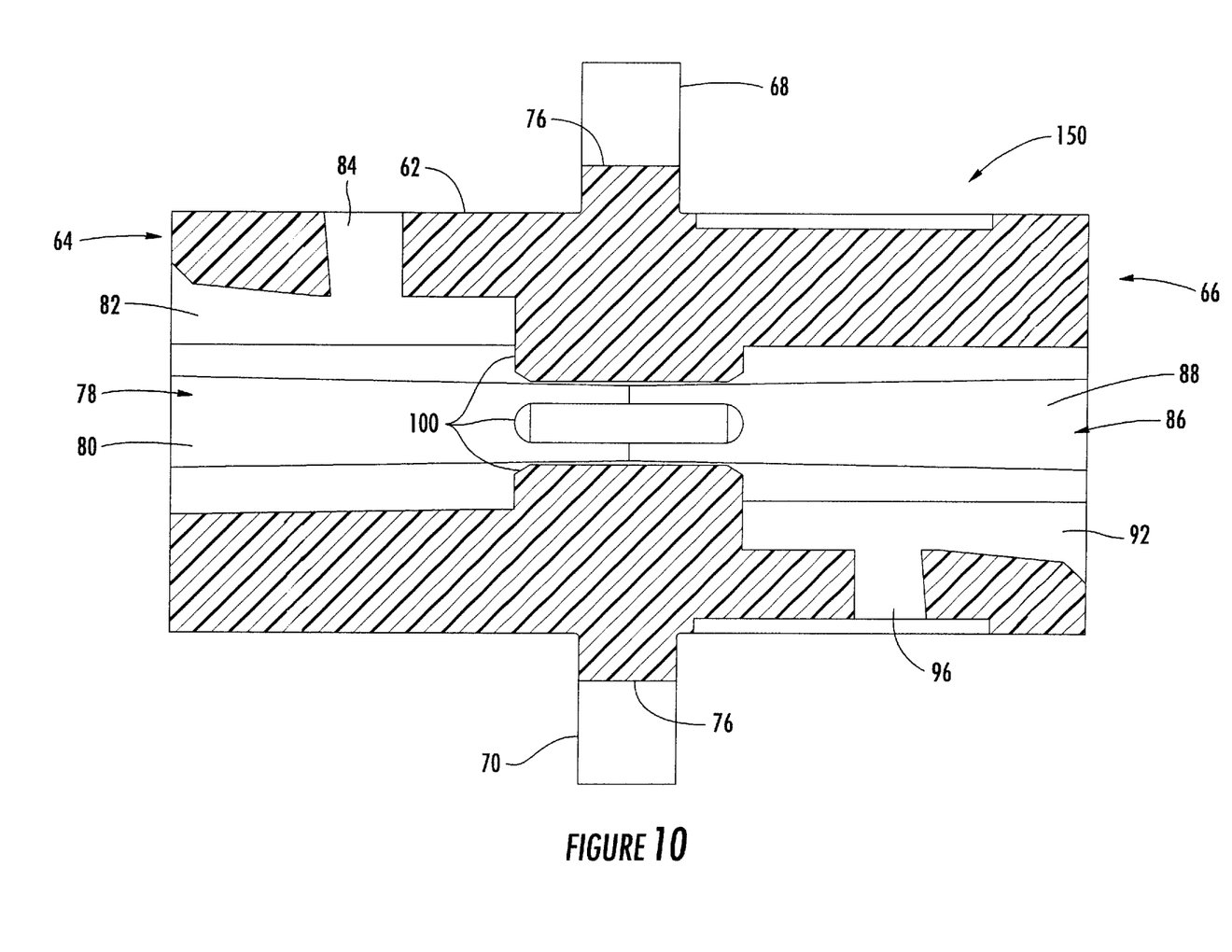
FIG. 10 is a cross-sectional view of an MT-RJ style adapter configured to receive a pair of MT-RJ connectors in a reverse orientation.

FIG. 10 depicts a side, cross-sectional view of an alternative exemplary MT-RJ adapter 150 that is configured to receive a pair of MT-RJ connectors (not shown) only in a reverse configuration. In other words, the connectors are insertable into the adapter 150 only in a configuration that is opposite from the manner in which they were originally intended. As a result, the adapter 150 provides a corrected interconnection for connectors when one of two connectors has a reversed polarity.

The adapter 150 is similar in many respects to the adapter 60 described earlier. However, the contractor end 66 provides only a single key way 92 and single tab aperture 96 adjacent the main entrance portion 88 rather than the pair of key ways 90, 92 and tab apertures 94, 96 provided with the adapter 60. As shown, the key way 92 is located on the opposite (lower) side of the adapter 150 from the key way 82 on the user side 64. As a result of this reverse orientation of the key ways 82, 92, a connector inserted into the contractor end 66 can only be inserted in an orientation reversed from that of a connector inserted into the user end 64. Thus, if a reverse polarity problem is detected where a standard adapter (having key ways on the user and contractor ends on the same side of the adapter) is used, the problem is correctable by substituting the reverse adapter 150 for the standard adapter.

Figure 11:
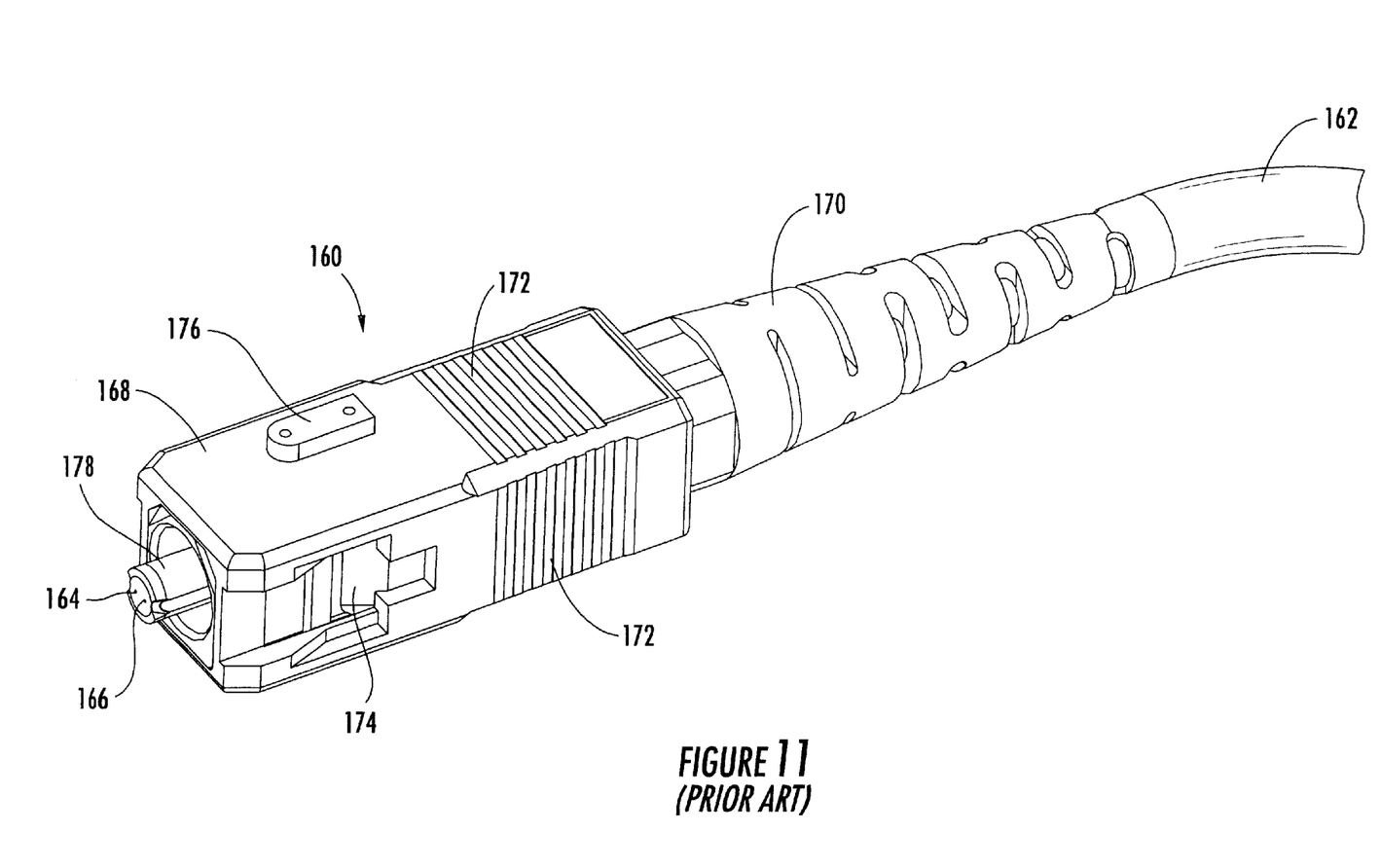
FIG. 11 is an isometric view depicting an SC-DC connector of a type known in the art.

FIG. 11 illustrates an exemplary SC-DC type connector 160 for the end of a fiber optic cable 162 having transmitting and receiving optical fibers 164, 166. The SC-DC connector is a known connector that has an outer housing 168 that is roughly shaped as a rectangular block. A rubber sheath 170 acts as a bend limiter for the cable 162. The housing 168 presents molded gripping areas 172 for manual engagement and gripping of the housing 168. The housing 168 also includes a pair of recesses 174 (one shown) disposed on opposite sides of the housing 168 to retain complimentary locking flanges from an adapter. The housing also presents an outwardly extending orientation key 176 on one side. The key 176 is shaped and sized to fit within a complimentary slot in an adapter to ensure that the connector 160 is inserted into the adapter according to a predetermined orientation. The housing 168 contains a cylindrically shaped ferrule 178 within which are secured the optical fibers 164 and 166.

Figures 12, 13:
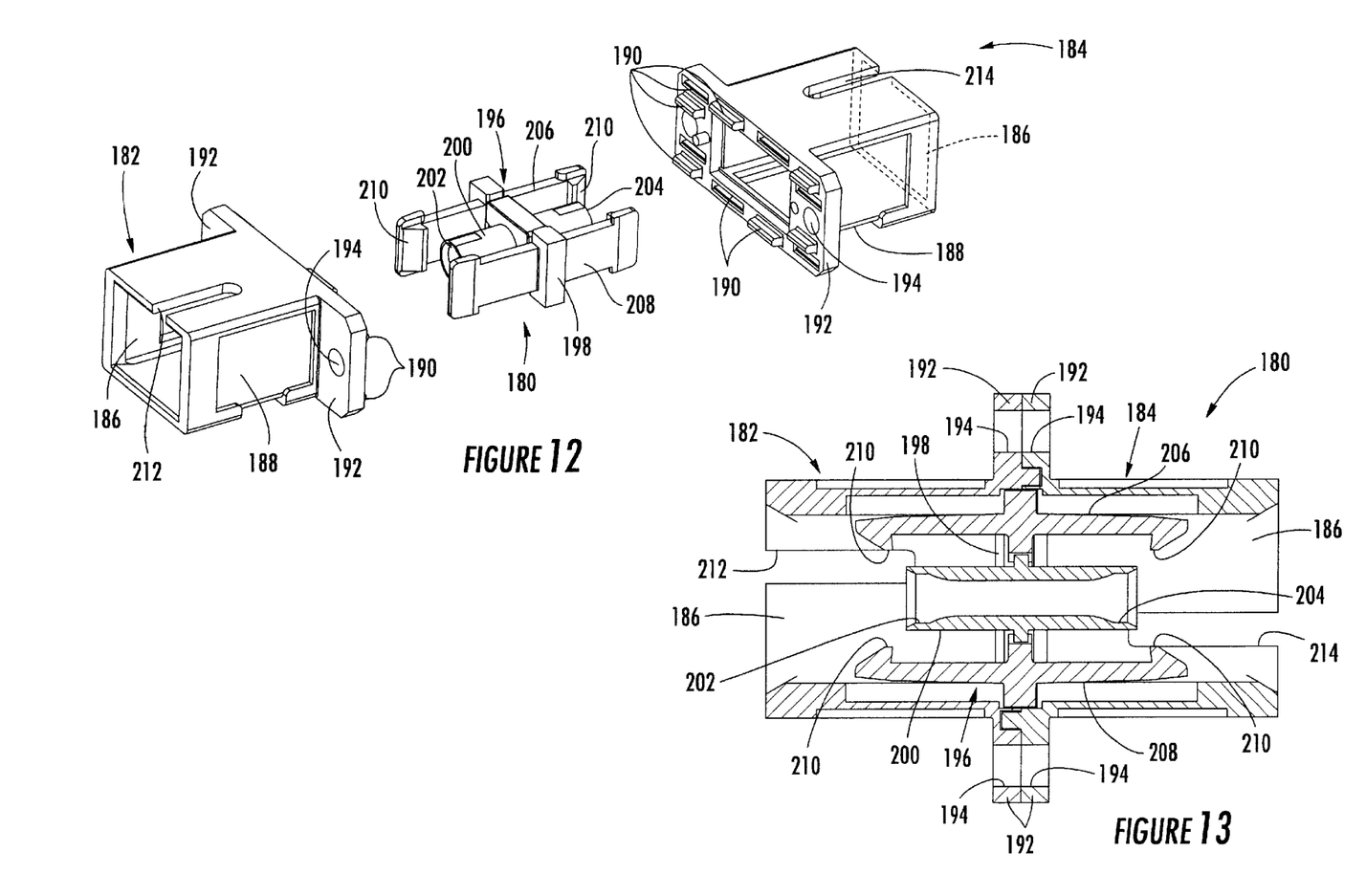
FIG. 12 is an exploded view of an exemplary SC-DC adapter configured to receive a pair of SC-DC connectors in a standard orientation.
FIG. 13 is a cross-sectional view of the adapter depicted in FIG. 12.

FIGS. 12 and 13 depict a standard, known adapter 180 for use in interconnecting a pair of SC-DC connectors of the type shown in FIG. 11. The adapter 180 has an outer housing formed of two interengageable halves 182, 184, each of the halves defining a central passage 186 therethrough. The passages 186 are roughly rectangular in shape and sized to accommodate the housing of an SC-DC connector such as connector 160. The halves 182, 184 each have external recesses 188 into which a complimentary attachment clip (not shown) can fit for attaching the adapter 180 to a supporting frame or the like. Complimentary projections and recesses 190 are provided on the mating surfaces of the two halves 182, 184 to ensure precise alignment and interengagement of the two halves 182, 184. The halves 182, 184 each have complimentary outwardly extending flanges 192 with openings 194 for the disposal of bolts, screws or other connectors (not shown) so that the adapter 180 might be easily affixed to a slot in a connector box or a wall outlet box.

When the halves 182, 184 are joined, as shown in FIG. 13, they retain a securing member 196 therebetween. The securing member 196 has a central web 198 that retains a hollow tubular plug 200 having a pair of openings 202, 204 at either end. The plug 200 is centrally located within the passages 186 of each adapter half 182, 184. The openings 202, 204 of the plug 200 are shaped and sized to receive the ferrule 178 of an SC-DC connector 160. The securing member 196 also retains a pair of gripping members 206, 208. These gripping members 206, 208 present locking flanges 210 on either end that are shaped and sized to fit within a recess 174 of the housing 168 of an SC-DC connector 160.

Slots 212 and 214 are disposed in each of the adapter halves 182, 184. It is noted that the slots 212, 214 will both be located on the same side, i.e., the lower side, of the adapter 180 when the adapter 180 is assembled. This placement of the slots 212, 214 ensures that connectors placed into the passages 186 of the halves 182, 184 will be aligned so as to provide a proper interconnection for the transmitting and receiving fibers therewithin. In operation, an SC-DC connector 160 is placed into each of the passages 186 of the halves 182, 184. The key 176 of one of each of the two SC-DC connectors 160 will reside within one of the slots 212, 214. The ferrules 178 of the connectors 160 will be disposed within the openings 202 and 204 of the tubular plug 200. When the connectors 160 are fully seated within the adapter 180, the locking flanges 210 of the gripping members 206, 208 will snap into the recesses 174 on the housings 168 of the connectors 160 to secure the connectors 160 within the adapter 180.

Figure 14:
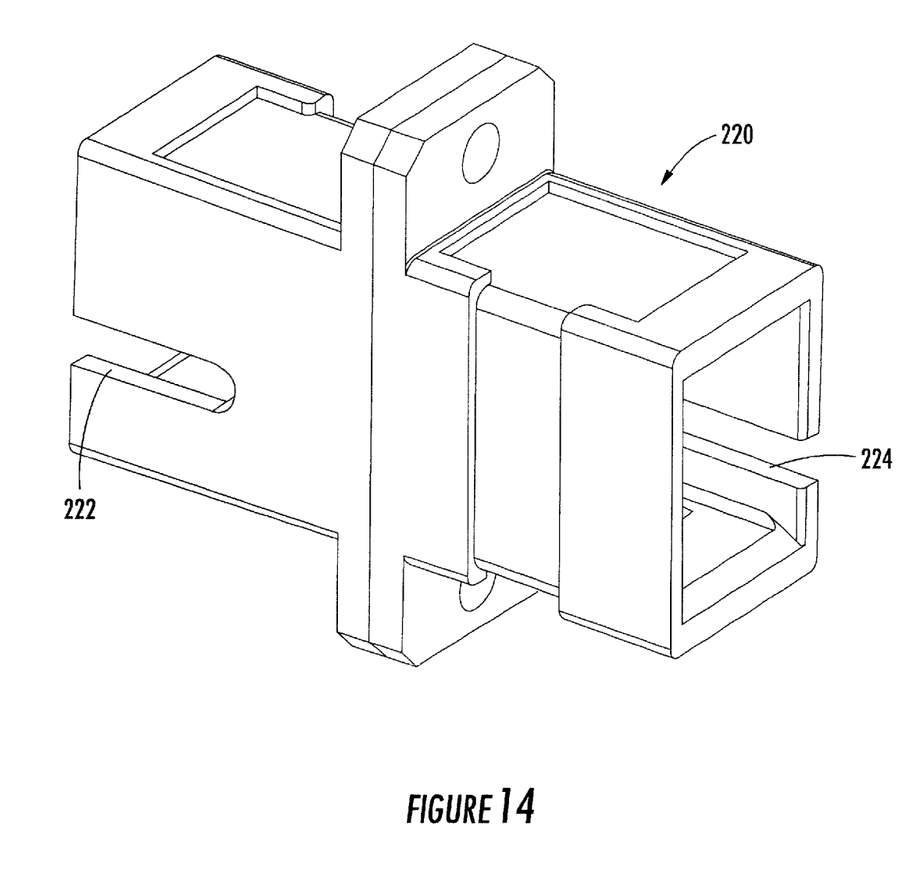
FIG. 14 is an isometric view of an exemplary SC-DC adapter configured to receive a pair of SC-DC connectors in a reverse orientation.

FIG. 14 illustrates a novel replacement adapter 220 for the adapter 180 just described. The replacement adapter 220 is constructed and operates in substantially the same manner as the adapter 180. However, the replacement adapter 220 has slots 222 and 224 located on opposite sides of the adapter 220 rather than on the same side as slots 212 and 214 were for the adapter 180. This placement of slots 222, 224 ensures that two inserted connectors 160 will have a reverse orientation with respect to one another, as it will be understood that one of the two connectors 160 will need to be inverted from the orientation used for insertion into the adapter 180. It can be seen, then, that a reverse polarity problem can be corrected by substituting the reverse adapter 220 for the standard adapter 180.

Figure 15:
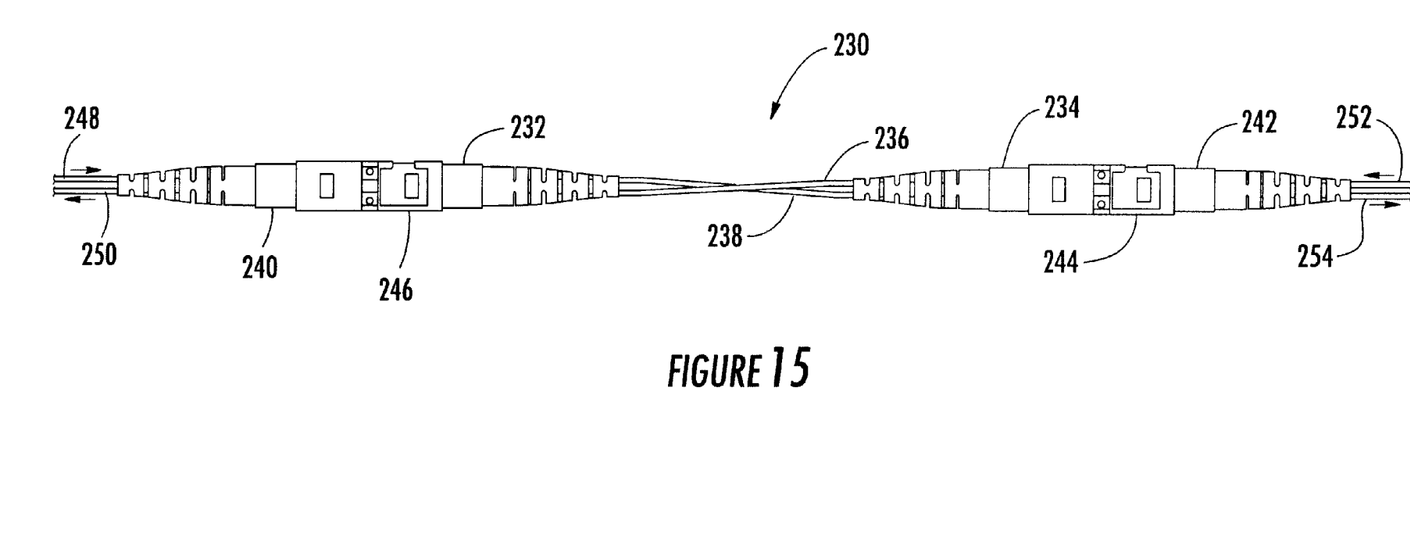
FIG. 15 is a schematic drawing depicting an exemplary structure for a jumper in accordance with the present invention.

Also in accordance with the present invention, an intermediate component, such as a jumper, can be disposed between a first connector and a second connector (or a wall outlet and an adapter) to provide polarity reversal. The jumper provides a structure that receives transmitting and receiving signals and reverses their physical positions. FIG. 15 provides a schematic diagram for such a component. The jumper 230, which has two connectors 232, 234 and two fibers 236, 238 (which are also shown schematically for clarity purposes) is positioned between a first connector 240 and a second connector 242, either one of which may be located in a wall or in an electrical component, for example. The connectors are depicted generally, and, it should be understood that these connectors may constitute any of the connectors discussed above, or even other styles of fiber optic connectors that may have their polarity reversed.

As depicted in FIG. 15, connectors 240 and 242 have a reverse polarity problem. Connector 240, which has fibers 248 and 250 shown schematically, for clarity, has fiber 248 as the transmitting fiber and fiber 250 as the receiving fiber. (Arrows indicate the direction of light travel in the optical fibers.) However, connector 242, which also shows the fibers 252 and 254 schematically for clarity, has fiber 252 as the transmitting fiber and fiber 254 as the receiving fiber. If connectors 240 and 242 were directly connected (with a regular adapter or connector sleeve), the transmitting fibers and the receiving fibers would be aligned, resulting in no transmission of light through this junction.

An exemplary jumper 230 has the two connectors 232, 234 and two fibers 236, 238 extending between the connectors. Jumper 230 may be of any length, with the fibers 236, 238 being of any length. The jumper may even be a solid piece, with no visible fibers between the connectors.

In order to reverse the polarity problem, the jumper 230 is then mechanically and optically connected to the connectors 240, 242 by adapters 244, 246. Adapters 244 and 246 may be similar to adapter 60, which would be used in this case with both connectors keyed to the same side. Alternatively, regular (non-polarity reversing) adapters may also be used. The two fibers 236, 238 in jumper 230 cross over one another as they extend between connectors 232, 234. As a result of the cross-over, fiber 236 mates with fiber 252 at one end and mates with fiber 250 at its other end. Similarly, fiber 238 mates with fiber 248 at one end and with fiber 254 at the other end. As a result, the polarity reversal problem in the connectors 240, 242 will be corrected by the interpositioning of jumper 230 therebetween.

The present invention has been described with respect to two of the more common varieties of connectors and adapters in use today: the SC-DC and the MT-RJ styles. It will be understood by one of skill in the art, however, that the devices and methods of the invention are applicable to other styles of keyed connectors and adapters, including the LC, VF-45, LX.5 and SC Duplex styles. Each of these connectors have a pair of side-by-side housings, each having an orientation key. Each of the housings contains an optical fiber ferrule that retains a single fiber therein. An adapter for the SC duplex has a pair of receptacles to receive the two housings. Each of the receptacles has a keyway to accommodate the orientation keys of the connector housings. Novel adapters could be constructed, in accordance with the present invention, that have the key ways in reversed positions at one end or that have selectively blockable keyways.

Furthermore, while the invention has been shown or described in only some of its forms, it should be apparent to those skilled in the art that it is not so limited, but is susceptible to various additional changes within departing from the scope of the invention.

What is claimed is:

1. An adapter for receiving a connector having an orientation key, the adapter comprising:

a housing defining a connector receptacle having an entrance to receive and retain the connector;

a first key way located in the housing proximate the entrance to receive and guide the orientation key during reception of the connector within the adapter in a first orientation;

a second key way located in the housing proximate the entrance to receive and guide the orientation key during reception of the connector within the adapter in a second orientation, the first orientation being different from the second;

a key excluder configured to be selectively inserted into the second key way to prohibit the orientation key from being received within the second key way, but allow insertion of the key into the first key way with the connector in the first orientation; and the key excluder configured also to be selectively insertable into the first key way to prohibit the orientation key from being received within the first key way, but allow insertion of the key into the second key way with the connector in the second orientation.

2. The adapter of claim 1 wherein the first and second key ways each comprise a longitudinally slotted portion of the housing adjoining the entrance.

3. The adapter of claim 2, wherein the key excluder comprises a longitudinal body portion that is shaped and sized to lie within each of the key ways thereby precluding entry of the orientation key into the key way in which the key excluder is located.

4. The adapter of claim 1 further comprising written indicia upon the housing to indicate a default configuration for disposal of the key excluder within the housing.

5. An adapter for receiving a connector having an orientation key, the adapter comprising:

a housing defining a first connector receptacle having an entrance to receive and retain the connector;

a first key way located in the housing proximate the entrance to receive and guide the orientation key during reception of the connector within the adapter in a first orientation; and a second key way located in the housing proximate the entrance to receive and guide the orientation key during reception of the connector within the adapter in a second orientation, the first orientation being different from the second;

wherein the housing defines a second connector receptacle located alongside the first connector receptacle in a side-by-side relation, the second connector receptacle having first and second key ways for selectively receiving the orientation key of a connector received within the second connector receptacle.

6. An adapter for retaining fiber optic first and second connectors in a generally abutting relation, and maintaining consistent polarity between fibers in the connectors, comprising:

a body with a standard first receptacle on a first end to selectively receive the first connector therewithin, the first receptacle having a configuration to receive the first connector only when the first connector is in a standard orientation; and the body of the adapter having a second receptacle on a second end to selectively receive the second connector therewithin so that a mating relation between the first and second connectors is established to form a connection, the second receptacle having a standard configuration to receive the second connector only when the second connector is in a standard orientation to establish consistent polarity between the connectors; and the second receptacle being adjustable to a reverse configuration to receive the second connector only when the second connector is in a reverse orientation and polarity in the event that the polarity was inconsistent.

7. The adapter of claim 6 wherein the second receptacle has a main entrance and a pair of opposed retainer slots adjoining opposite walls of the main entrance, each of the key ways adapted to receive a key mounted to the second connector, and wherein the adapter further comprises a removable key excluder that selectively blocks one of the key ways, while in the standard configuration and in the other of the key ways while in the reverse configuration.

8. The adapter of claim 7 wherein the adapter has upper and lower sidewalls, each of the sidewalls having:

a tab aperture to secure a locking tab of the second connector in locking relation within the adapter body, and wherein the key excluder has a tab sized and shaped to fit within each of the tab apertures.

9. The adapter of claim 7 wherein the key excluder has an outer end with a recess formed therein for receiving a screwdriver blade to enable the key excluder to be pried from one of the retainer slots.

10. A method of connecting fiber optic first and second connectors together in a generally abutting relation to provide a connection of consistent polarity between fibers in the connectors, the method comprising:

a) providing an adapter body having:
 1) a standard first receptacle on a first end to selectively receive the first connector therewithin only when the first connector is in a standard orientation, and
 2) a second receptacle on a second end to selectively receive the second connector in either a standard orientation to establish a connection between the connectors when polarity is consistent between the connectors or a reverse configuration to establish a connection between the connectors when polarity between the connectors is inconsistent;

b) inserting the first connector within the first receptacle;

c) inserting the second connector within the second receptacle in a standard orientation; and d) inserting the second connector within the second receptacle in a reverse orientation to correct inconsistent polarity.

11. The method of claim 10 wherein the operation of inserting the second connector in a reverse orientation further comprises removing a removable key excluder from a first key way and disposing the key excluder within a second key way.

12. The method of claim 10 wherein the operation of inserting the second connector in a reverse orientation further comprises inverting the second connector.

13. A method of connecting fiber optic first and second connectors together in a generally abutting relation, each of the connectors having an orientation key, the method comprising:

a) providing an adapter having first and second ends, each end having a connector receptacle, the connector receptacle on the first end having a key way slot, the connector receptacle on the second end having standard and reverse key way slots on opposed walls;

b) inserting a key excluder into the reverse key way slot on the second end;

c) on the first end, inserting the first connector into the receptacle and the key into the key way slot;

d) on the second end, while the key excluder is in the reverse key way slot, inserting the second connector into the receptacle and the key into the standard key way slot;

e) then, if polarity is reversed, removing the second connector and the key excluder from the reverse key way slot; then f) inserting the key excluder into the standard key way slot, inverting the second connector and reinserting it into the receptacle with the key of the second connector fitting in the reverse key way slot.

14. An adapter for retaining fiber optic first and second connectors in a generally abutting relation, and correcting a reversed polarity condition for fibers in one of the connectors, comprising:

a body with a standard first receptacle on a first end to selectively receive the first connector therewithin, the first connector having a configuration to receive the first connector only when the first connector is in a standard orientation; and the body of the adapter having a second receptacle on a second end to selectively receive the second connector therewithin so that a mating relation between the first and second connectors is established to form a connection, the second receptacle having a reverse configuration to receive the second connector only when the second connector is in a reverse orientation and polarity in the event that the polarity was inconsistent.

15. The adapter of claim 14 wherein the first and second receptacles are shaped and sized to each receive an MT-RJ connector.

16. The adapter of claim 14 wherein the first and second receptacles are shaped and sized to each receive an SC-DC connector.

17. The adapter of claim 5 wherein the first and second key ways each comprise a longitudinally slotted portion of the housing adjoining the entrance.

18. The adapter of claim 5 further comprising a key excluder configured to be selectively inserted into the second key way to prohibit the orientation key from being received within the second key way, but allow insertion of the key into the first key way with the connector in the first orientation, the key excluder configured also to be selectively insertable into the first key way to prohibit the orientation key from being received within the first key way, but allow insertion of the key into the second key way with the connector in the second orientation.

19. The adapter of claim 18 wherein the key excluder comprises a longitudinal body portion that is shaped and sized to lie within each of the key ways thereby precluding entry of the orientation key into the key way in which the key excluder is located.

20. The adapter of claim 18 further comprising written indicia upon the housing to indicate a default configuration for disposal of the key excluder within the housing.

* * * * *